Nov. 2, 1926.　　　　　　　　　　　　　　　　　　　　　1,605,448
L. LEE
AUTOMOBILE LOCKING DEVICE
Filed Dec. 1, 1924
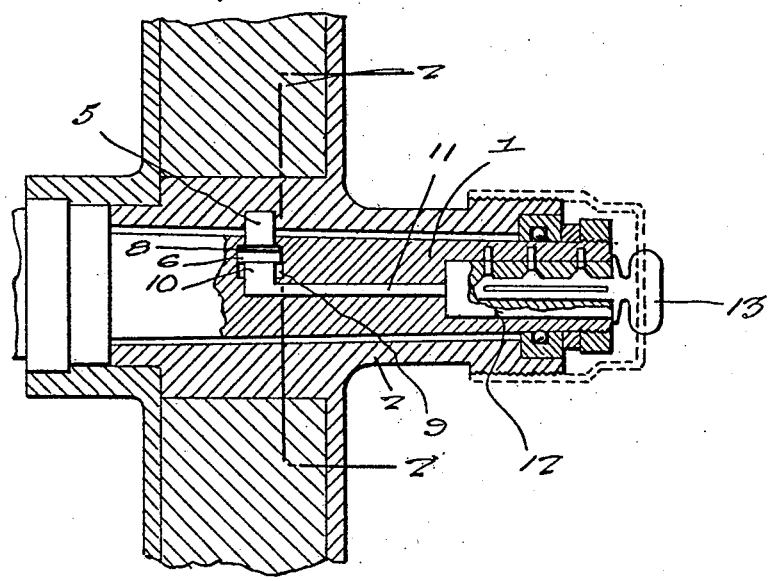
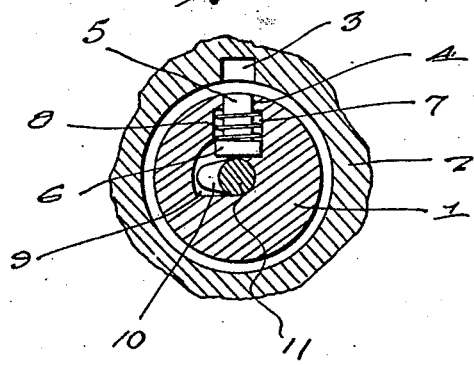
Inventor
L. Lee
By Clarence A. O'Brien
Attorney Patented Nov. 2, 1926.

1,605,448

UNITED STATES PATENT OFFICE.

LOUIE LEE, OF INDIANAPOLIS, INDIANA; JACK WALTON ADMINISTRATOR OF SAID LOUIE LEE, DECEASED.

AUTOMOBILE LOCKING DEVICE.

Application filed December 1, 1924. Serial No. 753,236.

This invention relates to improvements in locking devices for automobiles and has for its principal object to provide a simple and efficient means for locking the drive wheels of an automobile against rotation on the rear axle whereby the automobile cannot be moved by its own power.

A further object of the invention is to provide an automobile locking device of the above mentioned character, which will prevent any unauthorized person from attempting to drive the automobile, the locking means being adapted to be concealed so that the same is not ordinarily visible.

A further object of the invention is to provide an automobile locking device of the above mentioned character, which may be readily and easily secured in position without necessitating any material alteration of the rear axle and the hub of one of the drive wheels.

A still further object is to provide an automobile locking device of the above mentioned character, which is simple in construction, inexpensive, strong and durable and furthermore adapted for the purposes for which it is designated.

Other objects and advantages of this invention will become apparent during the course of the following description.

In the accompanying drawing forming a part of this specification and in which like numerals designate like parts throughout the same:

Figure 1 is a sectional view through the rear axle and the hub of the wheel mounted thereon showing the manner in which my improved locking device is associated therewith, the lock being illustrated in an operative position, and Figure 2 is a sectional view taken approximately on line 2—2 of Figure 1 with the lock disposed in an inoperative position.

In the drawing wherein for the purpose of illustration is shown the preferred embodiment of my invention, the numeral 1 designates one end of the rear axle of an automobile on which is supported in the usual manner, a drive wheel, the hub portion of which is designated as 2. The hub 2 is provided with a recess 3 as clearly illustrated in Figure 2. An aligning recess 4 is provided in the axle 1 and slidable within the recess 4 is the bolt 5. A head 6 is formed on the lower end of the bolt 5 and is adapted for slidable movement in the enlarged recess 7. A coil spring 8 is disposed within the enlarged recess 7 and encircles the lower portion of the bolt as clearly illustrated in Figure 2. The coil spring 8 normally holds the bolt 5 out of engagement with the recess 3 in the hub 2 so that the drive wheel may rotate freely on the axle in the usual manner.

Cooperating with the bottom of the enlarged recess 7 is the arcuate cut out portion 9 and the purpose thereof is to provide a means for permitting the swinging movement of the cam 10 which is associated with the inner end of the elongated rod 11, the latter extending longitudinally within the axle 1. The cam 10 is adapted for engagement with the head 6 formed on the lower end of the bolt 5 for moving the bolt into an operative position in the manner hereinafter to be more fully described.

A cylinder or barrel lock designated generally by the numeral 12 of any conventional construction is arranged in the end of the axle 1 and a rotatable barrel is secured to the outer end of the rod 11 whereby the same will rotate simultaneously. Normally the cylinder lock is concealed when the usual hub cap is threaded over the outer threaded end of the hub as is clearly illustrated in the dotted lines in Figure 1. As heretofore stated, the bolt 5 is normally held out of engagement with the recess 3 and the cam 10 is disposed in the arcuate cut away portion 9 in the manner as clearly illustrated in Figure 2.

When it is desired to lock the automobile so that any unauthorized person cannot drive the same, the vehicle is driven backward and forward until the recesses are in alignment with each other, the hub cap is removed and a proper key illustrated at 13 is then inserted in the cylinder or barrel lock 12 and by rotating the same in the proper direction, the barrel will be caused to rotate simultaneously causing the rotation of the rod 11 and the upward swinging movement of the cam 10 which is carried by the inner end of the rod. It is of course to be understood that any suitable means may be provided for indicating when the recesses 3 and 4 will be in alinement with each other. The upward swinging movement of the cam 10 will cause the same to engage the head 6 of the bolt 5 moving the bolt upwardly through the recesses 4 and 7 whereby the upper end of the bolt will be moved into locked engagement with the recess 3 in the manner clearly illustrated in Figure 1. The key 13 is then removed and the hub cap is applied. It is obvious that when the bolt is in the position as shown in Figure 1. the drive wheels of the automobile cannot rotate on the axle thus preventing the automobile being driven away by its own power. When the proper person inserts the proper key within the barrel lock and rotates the barrel in the opposite direction, the cam 10 will be moved out of engagement with the bolt head 6 and permit the spring 8 to return the bolt to its normal position so that the same is out of engagement with the recess in the hub of the drive wheel. The automobile may then be driven in the usual manner.

It will thus be seen from the foregoing description, that an automobile locking device has been provided which may be readily and easily secured in position without materially altering the parts of the automobile with which the same is associated and if desired. a locking device of the above mentioned character may be associated with each of the wheels of the automobile. The simplicity in which the locking device is constructed enables the same to be easily and efficiently actuated.

While I have shown the preferred embodiment of my invention, it is to be understood that various changes in the size, shape and arrangement of parts may be resorted to without departing from the spirit of the invention and the scope of the appended claim.

Having thus described the invention, what I claim is:—

An automobile locking device comprising in combination with a rear axle, and the hub of a drive wheel mounted thereon, said hub and rear axle having aligning recesses provided therein, a bolt supported in the recess in the axle, a coil spring disposed in said recess and encircling said bolt for normally holding the same out of engagement with the recess in the hub, means for moving the bolt into locking engagement with the recess in the hub whereby the drive wheel is locked against rotation with respect to the axle, said means comprising a cylinder lock mounted in the outer end of the axle, a rod associated with the lock and adapted for rotation therewith, said rod extending longitudinally in the axle and a cam on the inner end of the rod, said cam adapted for engagement with the lower end of the bolt for moving the bolt into a locking position when the lock is rotated in one direction.

In testimony whereof I affix my signature.

LOUIE LEE.